United States Patent [19]

Dunne et al.

[11] Patent Number: 5,124,035
[45] Date of Patent: Jun. 23, 1992

[54] APPARATUS FOR TREATMENT OF EFFLUENT

[76] Inventors: Patrick F. Dunne, 82 Walden Crescent, Regina, Saskatchewan, Canada, S4N 1L3; Ralph H. Cook, P.O. Box 557, Pilot Butte, Saskatchewan, Canada, S0G 3Z0

[21] Appl. No.: 576,838

[22] Filed: Sep. 4, 1990

[51] Int. Cl.⁵ .............................................. B01D 21/18
[52] U.S. Cl. ................................. 210/206; 210/205; 210/207; 210/208; 210/251; 210/259; 210/322; 210/456; 210/523; 210/532.1; 366/339; 366/340
[58] Field of Search .................. 210/198.1, 205, 206, 210/207, 208, 259, 322, 456, 523, 532.1, 251; 366/336, 340, 341, 337, 339

[56] References Cited

U.S. PATENT DOCUMENTS

| | | | |
|---|---|---|---|
| 3,045,984 | 7/1962 | Cochran | 366/340 |
| 3,886,073 | 5/1975 | Briltz | 210/205 |
| 3,965,975 | 6/1976 | Edmundson | 366/336 |
| 4,142,970 | 3/1979 | von Hagel et al. | 210/208 |
| 4,192,746 | 3/1980 | Arvanitakis | 210/259 |
| 4,260,488 | 4/1981 | Condolios | 210/208 |
| 4,710,290 | 12/1987 | Briltz | 210/205 |
| 4,834,878 | 5/1989 | Anderson | 210/208 |
| 4,840,736 | 6/1989 | Sander et al. | 210/770 |

Primary Examiner—W. Gary Jones
Attorney, Agent, or Firm—Adrian D. Battison; Stanley G. Ade; Murray E. Thrift

[57] ABSTRACT

A system for treating effluents such a sewage includes a mixing chamber and a separation chamber. In the mixing chamber various chemical additives are introduced in to the effluent and thoroughly mixed to act as a flocculent to extract the solid materials in the separating chamber. In the separating chamber the mixed materials are caused to flow longitudinally in a laminar flow condition to allow stratification of the liquid from the solid materials. In the mixing chamber there is provided a plurality of transverse baffles spaced longitudinally and rotated angularly relatively to a longitudinal axis of the tube. Each baffle has tapered holes to act as a venturi to mix the materials. In the separation chamber there is provided an auger flight rotating slowly which has holes through the flight thus generating a laminar flow to provide improved separation of the solid and the liquid components.

14 Claims, 3 Drawing Sheets

APPARATUS FOR TREATMENT OF EFFLUENT

FIELD OF THE INVENTION

This invention relates to an apparatus for treatment of effluent of the type in which treatment chemicals are added to the effluent in a mixing chamber, the chemicals being of a type which acts to flocculate the solid contaminants following which the mixed effluent and chemicals are applied to a separating chamber which acts to stratify or separate the flocculated solids from the clear liquid.

BACKGROUND

At present treatment of effluent for example household sewage is either carried out centrally in a large capacity effluent plant generally run by a government organization or alternatively such effluent is treated by a conventional septic tank arrangement in which natural bacterial action is used to separate solids from an effluent liquid which is then dumped into a septic field.

Various attempts have been made over many years to generate a septic or effluent treatment system which is of a size suitable to be used in a relatively small location for example one household or a group of households or by for example a relatively small industrial process in which clear liquid basically suitable for human consumption can be extracted from the effluent or sewage leaving solids in sludge form which can be disposed of separately.

While the treatment chemicals have been available for many years which act as flocculents, up till now no suitable apparatus has been available which provides the necessary mixing chamber and the subsequent separating chamber in an efficient and effective manner at a cost of the apparatus which enables it to be supplied economically for individual use such as that described above.

Examples of apparatus proposed for this process are shown in U.S. Pat. Nos. 3,886,073 and 4,710,290, both by Raymond P. Briltz. However the apparatus shown in these patents are relatively complicated and expensive to manufacture and has accordingly achieved little success.

SUMMARY

One object of the present invention, therefore, to provide an improved apparatus for treatment of effluent.

According to a first aspect of the invention comprising there is provided apparatus for treating effluent comprising a mixing chamber having an effluent inlet, at least one inlet for treatment chemicals and an outlet arranged such that the effluent enters at the effluent inlet and moves through the chamber to the outlet and is mixed in the chamber With the treatment chemicals, and a separating chamber having an inlet, a clear liquid outlet and a sludge outlet, means for communicating the effluent from the mixing chamber outlet to the separating chamber inlet such that the effluent passes through the separating chamber and separates into clear liquid and sludge for extraction separately at said clear liquid outlet and said sludge outlet respectively, the mixing chamber comprises an elongate channel having a plurality of baffles extending across the channel, the baffles having holes therethrough through which the effluent passes, at least some of the holes being tapered from an inlet end to an outlet end to define a venturi effect in the passing therethrough.

According to a second aspect of the invention there is provided an apparatus for treating effluent comprising a mixing chamber having an effluent inlet, at least one inlet for treatment chemicals and an outlet arranged such that the effluent enters at the effluent inlet and moves through the chamber to the outlet and is mixed in the chamber with the treatment chemicals, and a separating chamber having an inlet, a clear liquid outlet and a sludge outlet, means for communicating the effluent from the mixing chamber outlet to the separating chamber inlet such that the effluent passes through the separating chamber and separates into clear liquid and sludge for extraction separately at said clear liquid outlet and said sludge outlet respectively, the separating chamber comprises an elongate duct having said inlet at one end of the duct and said clear liquid outlet and said sludge outlet at an opposed end of the duct, said clear liquid outlet being arranged at an upper part of said opposed end and said sludge outlet being arranged at a lower part of said opposed end, and means moveable in the duct to apply longitudinal movement to the sludge and the liquid in the duct tending to move the sludge and the liquid longitudinally of the duct toward said opposed end, said moveable means being arranged to generate a substantially laminar flow of the sludge and the liquid for stratification thereof in the duct.

According to a third aspect of the invention there is provided an apparatus for treating effluent comprising a mixing chamber having an effluent inlet, at least one inlet for treatment chemicals and an outlet arranged such that the effluent enters at the effluent inlet and moves through the chamber to the outlet and is mixed in the chamber with the treatment chemicals, and a separating chamber having an inlet, a clear liquid outlet and a sludge outlet, means for communicating the effluent from the mixing chamber outlet to the separating chamber inlet such that the effluent passes through the separating chamber and separates into clear liquid and sludge for extraction separately at said clear liquid outlet and said sludge outlet respectively, the separating chamber comprises an elongate duct having said inlet at one end of the duct and said clear liquid outlet and said sludge outlet at an opposed end of the duct, said clear liquid outlet being arranged at an upper part of said opposed end and said sludge outlet being arranged at a lower part of said opposed end, an auger flight mounted within the duct and rotatable about an longitudinal axis of the duct, the flight having a cross section substantially filling the cross section of the duct and having a plurality of holes therein, the flight tending to move the sludge and liquid toward said opposed end for stratification thereof in the duct.

With the foregoing in view, and other advantages as will become apparent to those skilled in the art to which this invention relates as this specification proceeds, the invention is herein described by reference to the accompanying drawings forming a part hereof, which includes a description of the best mode known to the application and of the preferred typical embodiment of the principles of the present invention, in which:

DESCRIPTION OF THE DRAWINGS

In the drawings like characters of reference indicate corresponding parts in the different figures.

DETAILED DESCRIPTION

Figure 1:
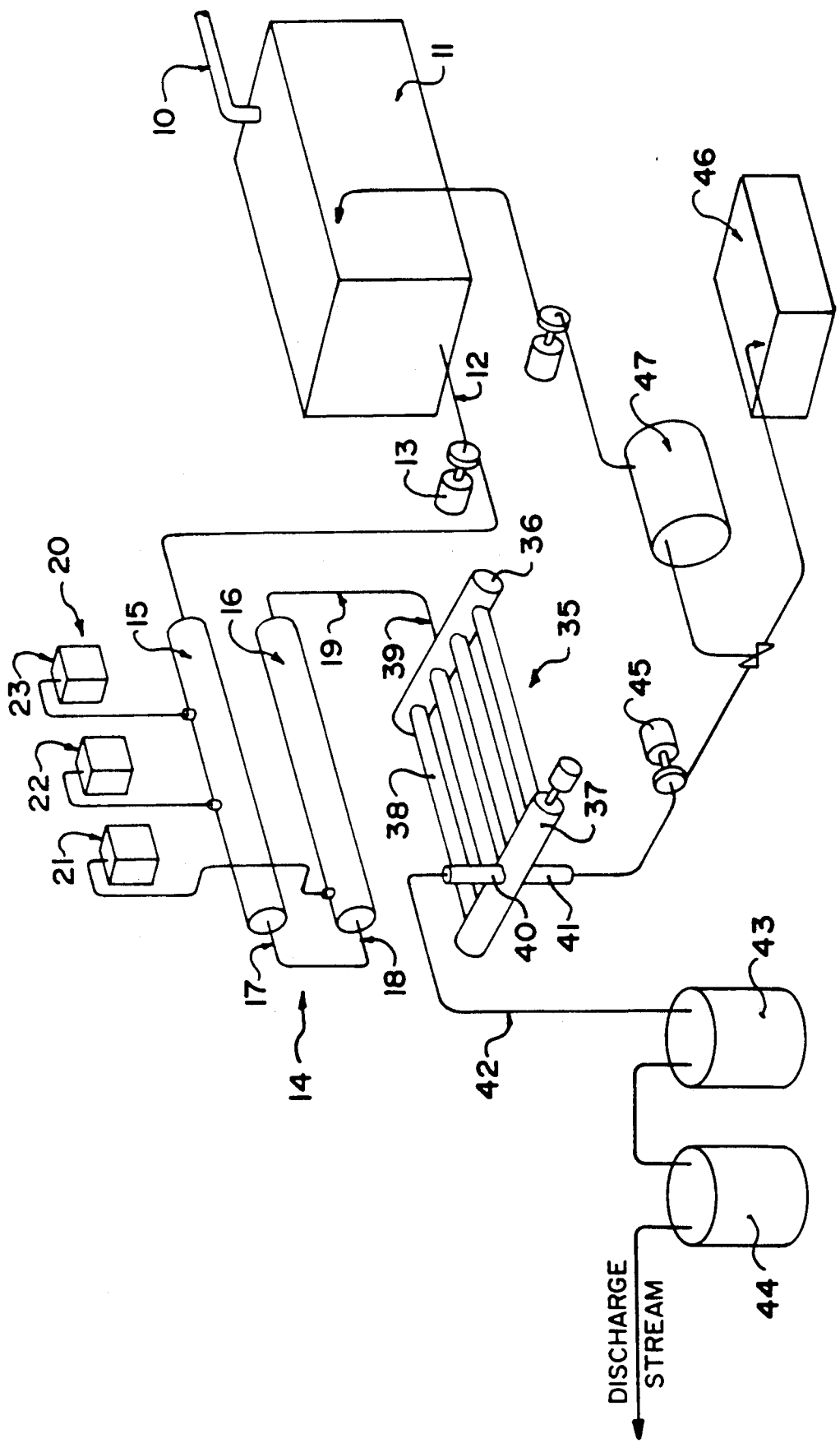
FIG. 1 is a schematic isometric view of the complete system for treatment of effluent according to the invention.

Turning firstly to FIG. 1 there is shown an inlet 10 leading from a source of contaminated water, fluids or liquids, for example the sewage system of a single household, from an industrial process or the like. The liquid which may contain solid material is supplied into a surge or holding tank 11 which acts as a reservoir for the treatment system. Liquid and solids from the tank are drawn through an outlet 12 to a grinder pump 13 which acts to breakdown any solids so as to be dispersed as a suspension within the liquid material mainly water.

The outlet from the grinder pump 13 is supplied into a mixing chamber system generally indicated at 14 and comprising a pair of mixing tubes 15 and 16 which are arranged in series so that the outlet from the first tube indicated at 17 is communicated to the inlet of the second tube indicated at 18 and leading to a final outlet 19 of the second tube at which the mixing is complete. A plurality of chemical injection systems indicated generally at 20 and includes three containers 21, 22, 23 for suitable chemical additives to be introduced into the liquids within the mixing chamber system. It will be noted that two of the additives are applied to the upper or first mixing tube 15 whereas the third of the additives is introduced into the second tube 16.

However position of injection, the type of chemicals and the number of different chemicals to be added does not constitute part of this invention and accordingly will not be described in detail. These matters are available to one skilled in the art and it suffice to say that the chemicals to be added generally act as flocculating agents for causing separation of the solid or particulate materials from the liquids within the mixing chamber. However during the initial stage of mixing it is the intention that the materials be maintained in a fluid state as a suspension of the solids within the liquid generally water so that a full mixing of the materials including the chemical additives can take place and can be fully complete at the outlet 19 of the second mixing tube.

Figure 2:
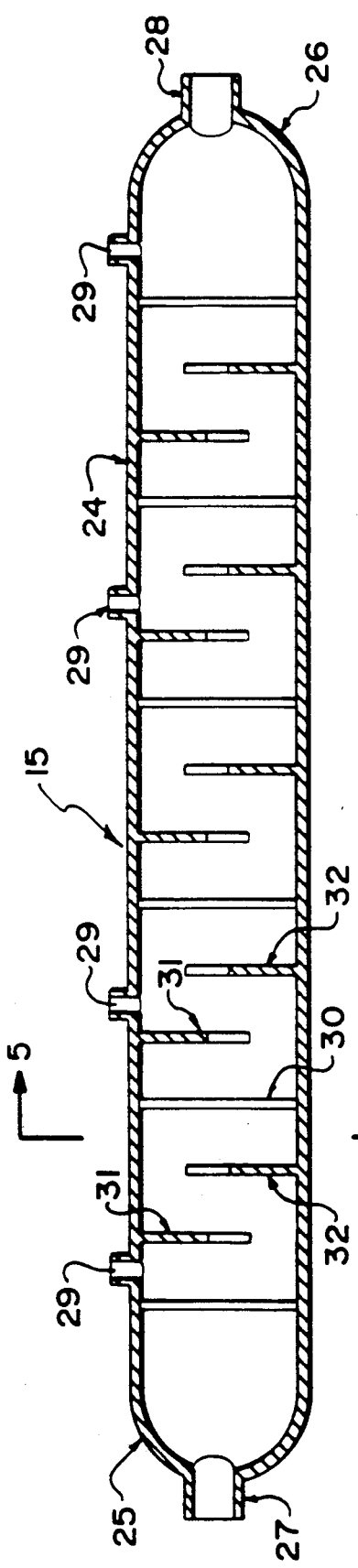
FIG. 2 is a longitudinal cross sectional view through one of the mixing chamber tubes of FIG. 1.
Figure 4:
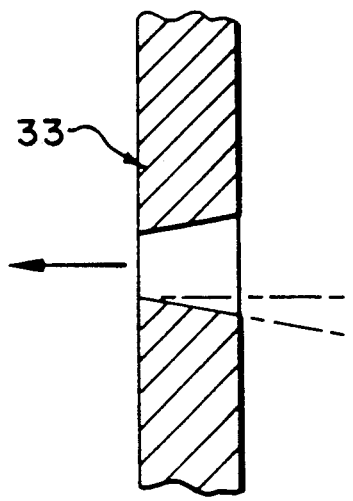
FIG. 4 is a cross sectional view on an enlarged scale of one plate forming a baffle within the mixing chamber of FIG. 2.
Figure 5:
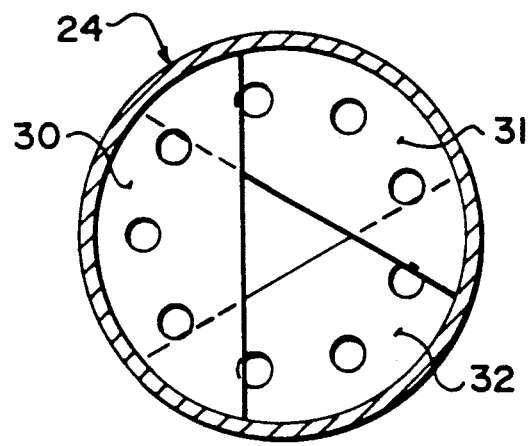
FIG. 5 is a cross sectional view along the lines 5—5 of FIG. 2.

The construction of the mixing tube 15 is shown best in FIGS. 2, 4 and 5. The second tube 16 is substantially identical.

The tube 15 comprises an elongate cylindrical duct having a peripheral wall 24 and two end closures 25 and 26. Each end closure includes a connecting duct portion 27 and 28 respectively including coupling means (not shown) for attachment to a suitable supply line for communication of the fluids as required. The peripheral wall includes a plurality of duct portions 29 each for connection to one of the chemical additive supplies if required or of course one or more of the duct 29 can be closed off.

Within the peripheral wall defining the cylindrical duct is provided a plurality of baffles indicated at 30, 31 and 32 respectively such that the baffles are equidistantly spaced along the length of the cylindrical duct so that there are a large number of said baffles arranged sequentially so that the next adjacent baffle is longitudinally spaced and also angularly spaced relative to any particular baffle. It will also be noted that on either side of the baffles 30 is provided one of the baffles 31 and one of the baffles 32 so that the sequence is followed along the length of the cylindrical duct.

Each of the baffles forms a sector of the circular cross section of the cylindrical duct with the sector forming less than 50% of the area. Thus the baffle 30 has a straight line edge which stands substantially vertical across the duct. The next adjacent baffle 30 is rotated through 120° and finally the third baffle in the sequence 32 is rotated again through 120° so that the fourth baffle in the sequence returns to the angle of the baffle 31.

The baffles each form less than 50% of the area of the cross sectional area, there is a triangular shaped common passage which extends along the full length. However the presence of the baffles tends to twist and move the fluids within the mixing chamber so that there is a full mixing action. In addition each of the baffles includes three holes with the holes being arranged substantially on a circle surrounding the longitudinal axis of the cylindrical chamber.

As shown in FIG. 4, each hole is formed in a plate 33 forming the respective baffle with the plate having a thickness sufficient that the hole as it passes through the thickness of the plate is tapered so that the angle of taper of the sides forming the hole is approximately 10°. This taper provides a venturi action within the fluids passing through the holes thus tending to inject the fluid into fluid down through the baffle at a higher velocity to cause a mixing action immediately downstream of the baffle.

The material thus emerges from the outlet 19 of the second mixing tube in a fully mixed condition with the flocculated particulate material in suspension within the liquid, generally water.

The apparatus further includes a separation chamber generally indicated at 35 including a header 36 at the inlet end, a header 37 at the outlet end and a plurality of tubes 38 extending longitudinally of the separation apparatus and connecting the header 36 to the header 37. Each of the headers thus comprises a transverse duct in the form of a cylindrical tubular body of substantially the same diameter as the longitudinal separation tubes.

The outlet 19 from the mixing chamber communicates with an inlet duct 39 extending horizontally into an end face of the header 36.

The outlet header 37 thus comprises a horizontal tube which includes at a center portion thereof a vertical outlet duct 40 for extraction of clear liquid that is water in the vertical upward direction. At the lower face is mounted a duct portion 41 extending vertically downwardly from the center section for deposit of solid materials.

The clear liquid outlet 40 connects to a discharge line 42 communicating with a first filter 43 and a second filter 44 before communication to a discharge stream for further use of the water. The filters 43 and 44 are shown schematically and can comprise conventional sand or other type filters and also if necessary a chlorination process of conventional type.

The sludge discharges vertically downwardly through the duct portion 41 is communicated to a sludge pump 45 leading to a sludge holding tank 46 for collection and subsequent removal. Alternatively the pump can communicate to a vacuum filter and dryer 47 with the sludge effluent being returned to the raw sewage tank 11.

Figure 3:
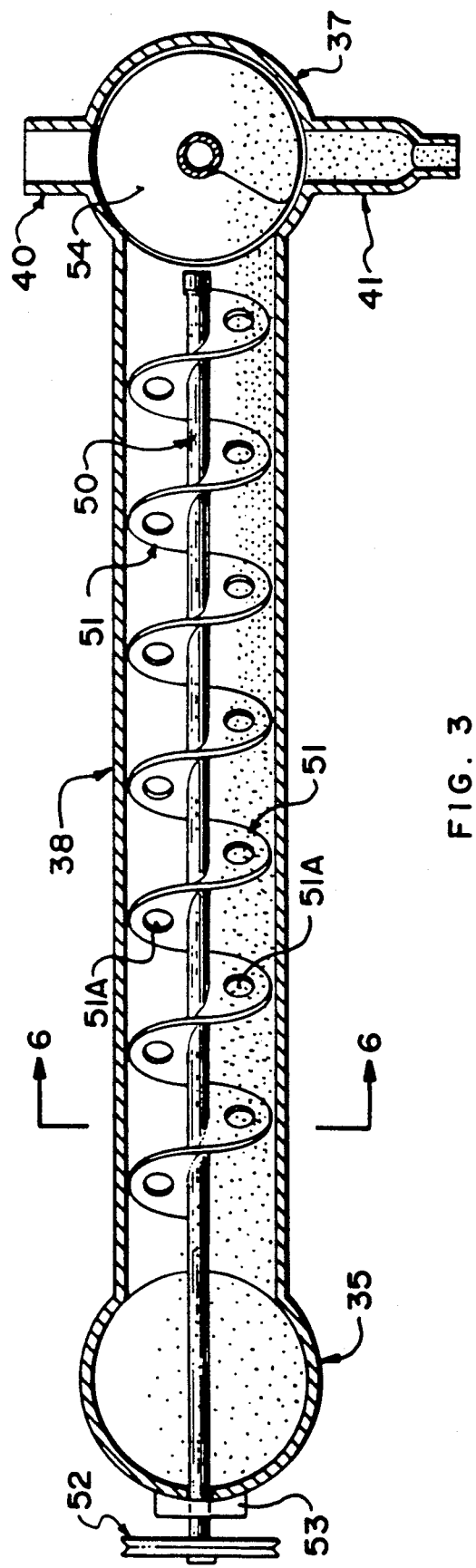
FIG. 3 is a longitudinal cross sectional view through one of the separating chamber tubes of FIG. 1.
Figure 6:
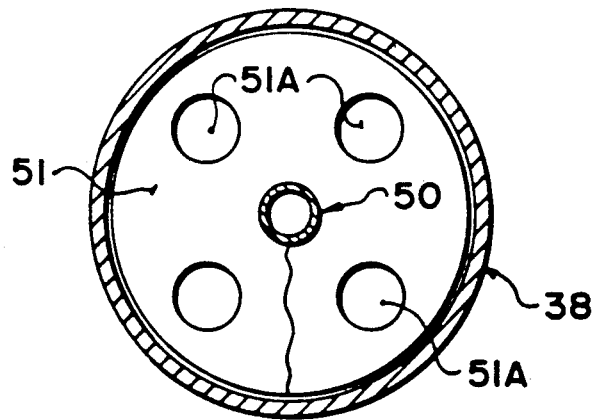
FIG. 6 is a cross sectional view along the lines 6—6 of FIG. 3.

The construction of the separation tubes is best shown in FIGS. 3 and 6. Specifically the tube 38 comprises a circular cylindrical tubular wall which is plain and free from inlets and connects at its ends to the headers as previously described Within the tube is mounted a shaft 50 carrying an auger flight 51 for rotation around an axis defined by the shaft. The shaft is driven by a pulley 52 coupled by an end of the shaft projecting outwardly through the header 36. The shaft is mounted on bearings 53 carried on the end face of the header 36. The flight comprises a substantially convention helical auger flight except that it has holes formed through the flight as best shown in FIG. 6. Thus around the axis of the shaft there are provided four holes equally angularly spaced around the axis. The auger is driven to rotate at a rate of the order of 10 RMP so that it gradually forwards the material longitudinally of the tube 38. At the same time the holes allow flow in a reverse direction through the flight. The clarifying tubes are thus designed to accomplish two things. Firstly the tubes allow the effluent to change from a turbulent state in the mixing chamber to a laminar flow condition within the separating tube. Secondly the precipitate which is allowed to stratify out of the liquid by the laminar flow is caused to move down the tube with a minimum disturbance of the precipitate or flocculent. This is accomplished by the slowly rotating screw auger mounted in the tube with a series of holes drilled through the auger flight. These holes allow the effluent to remain in a laminar flow condition as the effluent moves gradually along the length of the tube. Full stratification therefore of the material occurs with the flocculent settling toward the bottom of the tube and thus toward the bottom of the header 37 for collection within the downwardly extending duct portion 41. An auger flight 54 is mounted within the header 37 acting to move the material toward the central discharge duct 41 while maintaining the flocculent at the lower part of the header for discharge into the duct and thus collection away from the clear water which flows upwardly from the duct 40.

The aims and objects of the system and apparatus are therefore:

1) to produce an effluent that is fit for human consumption from raw, untreated, waste water, fluids, liquids, sewage or the like regardless of the contaminates.

2) to selectively remove contaminates from waste water, fluids, liquids, sewage or the like to allow the rejuvenated liquids to be recycled in a process and the contaminates recovered for a possible recycling or use.

3) to utilize the simple design of the invention in a minimum of space which will allow the invention to be used in confined areas such as ships or planes.

4) to have a complete system that can treat waste liquids from a minimum of eight liters per minute to any capacity by expanding the modular unit to meet capacity requirements. The modular unit is constituted by each of the clarifying tubes since of course the number of tubes attached to an individual header can be increased in accordance with the requirements.

5) to provide a system for domestic, commercial and industrial usage that can be operational in a minimum amount of time.

Basically these objectives are obtained by providing the mixing apparatus in which the effluent is kept in a turbulent state to allow the chemicals to react and to keep the precipitating suspension by the positioning of the baffles and the tapered holes in the baffles. These tapered holes have a venturi effect on the liquid passing through which helps to keep the effluent in the turbulent state.

The clarifying tubes are designed by the use of the auger moving system to gradually transmit the materials along the length of the tube while allowing the material by the laminar flow obtained to stratify or precipitate to allow the clear water to be drawn off vertically upwardly and the solids to be collected vertically downwardly.

Since various modifications can be made in my invention as hereinabove described, and many apparently widely different embodiments of same made within the spirit and scope of the claims without departing from such spirit and scope, it is intended that all matter contained in the accompanying specification shall be interpreted as illustrative only and not in a limiting sense.

We claim:

1. Apparatus for treating effluent comprising a mixing chamber having an effluent inlet, at least one inlet for treatment chemicals and an outlet arranged such that the effluent enters at the effluent inlet and moves through the chamber to the outlet and is mixed in the chamber with the treatment chemicals, and a separating chamber having an inlet, a clear liquid outlet and a sludge outlet, means for communicating the effluent from the mixing chamber outlet to the separating chamber inlet such that the effluent passes through the separating chamber and separates into clear liquid and sludge for extraction separately at said clear liquid outlet and said sludge outlet respectively, the mixing chamber comprising an elongate channel having a plurality of baffles extending across the channel, the baffles having holes therethrough through which the effluent passes, at least some of the holes being tapered from an inlet end to an outlet end to define a venturi effect in the effluent passing therethrough.

2. The apparatus according to claim 1 wherein each baffle extends across a part only of the cross sectional area of the channel, each baffle being longitudinally spaced from the next adjacent baffle and being angularly offset relative to the next adjacent baffle.

3. The apparatus according to claim 2 wherein the channel is cylindrical having a circular cross section, each baffle comprising a plate member defining a sector of the circular cross section which is less than 50% thereof with a straight line forming one edge of the sector shape defined by the plate of one baffle being angularly offset from that of the next adjacent baffle.

4. The apparatus according to claim 3 wherein the lines are offset by 120°.

5. The apparatus according to claim 1 wherein the taper of the holes is of the order of 10°.

6. The apparatus according to claim 1 wherein the separating chamber comprises an elongate/duct having said inlet at one end of the duct and said clear liquid outlet and said sludge outlet at an opposed end of the duct, said clear liquid outlet being arranged at an upper part of said opposed end and said sludge outlet being arranged at a lower part of said opposed end, and means moveable in the duct to apply longitudinal movement to the sludge and the liquid in the duct tending to move the sludge and the liquid longitudinally of the duct toward said opposed end, said moveable means being arranged to generate a substantially laminar flow of the sludge and a liquid for stratification thereof in the duct.

7. The apparatus according to claim 1 wherein the separating chamber comprises an elongate duct having said inlet at one end of the duct and said clear liquid outlet and said sludge outlet at an opposed end of the duct, said clear liquid outlet being arranged at an upper part of said opposed end and said sludge outlet being arranged at a lower part of said opposed end, an auger flight mounted within the duct and rotatable about an longitudinal axis of the duct, the flight having a cross section substantially filling the cross section of the duct and having a plurality of holes therein, the flight tending to move the sludge and liquid toward said opposed end for stratification thereof in the duct.

8. The apparatus according to claim 7 wherein the duct is substantially horizontal and wherein, the clear liquid outlet comprises a substantially vertical duct portion coupled to said duct at said opposed end and extending upwardly therefrom and wherein said sludge outlet comprises a substantially vertical duct portion coupled to said duct at said opposed end and extending downwardly therefrom.

9. The apparatus according to claim 7 including an inlet header at an inlet end of the duct for connection to a plurality of said ducts arranged in parallel spaced relation extending from said inlet header to an outlet header, each of said plurality of ducts having an auger flight therein.

10. The apparatus according to claim 9 wherein the outlet header comprises a transverse duct, wherein the clear fluid outlet comprises a single vertical duct portion extending vertically upwardly from said transverse duct and wherein said sludge outlet comprises a single vertical duct portion extending downwardly from said transverse duct and wherein is provided an auger flight in the transverse duct tending to move the liquid and sludge from the outlet ends of the elongate ducts to the single clear liquid outlet and the single sludge outlet.

11. Apparatus for treating effluent comprising a mixing chamber having an effluent inlet, at least one inlet for treatment chemicals and an outlet arranged such that the effluent enters at the effluent inlet and moves through the chamber to the outlet and is mixed in the chamber with the treatment chemicals, and a separating chamber having an inlet, a clear liquid outlet and a sludge outlet, means for communicating the effluent from the mixing chamber outlet to the separating chamber inlet such that the effluent passes through the separating chamber and separates into clear liquid and sludge for extraction separately at said clear liquid outlet and said sludge outlet respectively, the separating chamber comprises an elongate duct having said inlet at one end of the duct and said clear liquid outlet and said sludge outlet at an opposed end of the duct, said clear liquid outlet being arranged at an upper part of said opposed end and said sludge outlet being arranged at a lower part of said opposed end, an auger flight mounted within the duct and rotatable about an longitudinal axis of the duct, the flight having a cross section substantially filling the cross section of the duct and having a plurality of holes therein, the flight tending to move the sludge and liquid toward said opposed end for stratification thereof in the duct.

12. The apparatus according to claim 11 wherein the duct is substantially horizontal and wherein the clear liquid outlet comprises a substantially vertical duct portion coupled to said duct at said opposed end and extending upwardly therefrom and wherein said sludge outlet comprises a substantially vertical duct portion coupled to said duct at said opposed end and extending downwardly therefrom.

13. The apparatus according to claim 11 including an inlet header at an inlet end of the duct for connection to a plurality of said ducts arranged in parallel spaced relation extending from said inlet header to an outlet header, each of said plurality of ducts having an auger flight therein.

14. The apparatus according to claim 13 wherein the outlet header comprises a transverse duct, wherein the clear fluid outlet comprises a single vertical duct portion extending vertically upwardly from said transverse duct and wherein said sludge outlet comprises a single vertical duct portion extending downwardly from said transverse duct and wherein is provided an auger flight in the transverse duct tending to move the liquid and sludge from the outlet ends of the elongate ducts to the single clear liquid outlet and the single sludge outlet.

* * * * *